US012596005B2

(12) United States Patent
Svanholm

(10) Patent No.: US 12,596,005 B2
(45) Date of Patent: Apr. 7, 2026

(54) METHOD FOR OPERATING A GEODETIC INSTRUMENT, AND RELATED GEODETIC INSTRUMENT

(71) Applicant: Trimble Inc., Westminster, CO (US)

(72) Inventor: Set Svanholm, Sollentuna (SE)

(73) Assignee: Trimble Inc, Westminster, CO (US)

( * ) Notice: Subject to any disclaimer, the term of this patent is extended or adjusted under 35 U.S.C. 154(b) by 676 days.

(21) Appl. No.: 18/116,119

(22) Filed: Mar. 1, 2023

(65) Prior Publication Data

US 2023/0251090 A1 Aug. 10, 2023

Related U.S. Application Data

(63) Continuation of application No. PCT/EP2020/077354, filed on Sep. 30, 2020.

(51) Int. Cl.
*G01C 15/00* (2006.01)
*G01C 1/04* (2006.01)

(52) U.S. Cl.
CPC .............. *G01C 15/002* (2013.01); *G01C 1/04* (2013.01)

(58) Field of Classification Search
CPC ......... G01B 11/14; G01B 11/16; G01B 11/26; G01B 11/27; G01B 11/306; G01B 11/002; G01B 11/02; G01B 11/03; G01B 11/0608; G01B 11/0658; G01B 17/00; G01B 21/02; G01B 3/12; G01B 3/00; G01C 1/00; G01C 1/02; G01C 13/00; G01C 15/105; G01C 15/00; G01C 15/002; G01C 15/004; G01C 15/006; G01C 15/008; G01C 15/02; G01C 15/04; G01C 15/06; G01C 23/00;
(Continued)

(56) References Cited

U.S. PATENT DOCUMENTS

| | | | |
|---|---|---|---|
| 11,592,537 B2 * | 2/2023 | Helsloot | G01S 17/42 |
| 2012/0044476 A1 * | 2/2012 | Earhart | G01S 17/58 |
| | | | 356/4.01 |

(Continued)

FOREIGN PATENT DOCUMENTS

| | | |
|---|---|---|
| EP | 0 874 218 A1 | 10/1998 |
| WO | 2019/073377 A1 | 4/2019 |

OTHER PUBLICATIONS

International Search Report and Written Opinion for Application No. PCT/EP2020/077354, mailed Jun. 9, 2021, 13 pages.

*Primary Examiner* — John E Breene
*Assistant Examiner* — Daniel M Quinn
(74) *Attorney, Agent, or Firm* — Kilpatrick Townsend & Stockton LLP

(57) ABSTRACT

The present inventive concept relates to a method for operating a geodetic instrument comprising an optical source for assisting a user in aiming at a target in a scene by emitting optical pulses forming a spot at the target, and an imaging device, wherein the imaging device and the optical source share a common optical channel within the geodetic instrument, the method comprising: capturing a first image of a scene with the optical source turned on; obtaining a reference image from at least the first image, wherein contribution from the scene is suppressed, the reference image representing crosstalk occurring in the common optical channel; capturing a second image with the optical source turned on; and processing the second image with the reference image for removing crosstalk from the second image.

9 Claims, 7 Drawing Sheets

(58) Field of Classification Search
CPC ... G01C 3/22; G01C 3/04; G01C 3/08; G01C
5/00; G01C 9/12; G01C 9/24; G01C
9/28; G01C 9/32; G01C 1/04; G01J
5/0022; G01S 13/08; G01S 15/08; G01S
17/10; G01S 17/36; G01S 17/42; G01S
17/46; G01S 17/66; G01S 17/86; G01S
17/88; G01S 17/08; G01S 7/4813; G01S
7/4814; G02B 23/2476; G02B 27/0955;
G02B 6/0003; G02B 6/0008; G06F
1/1656; G06F 1/1684; H01S 3/02; Y10S
33/21; Y10S 33/01; Y10T 29/49002;
Y10T 428/2933; Y10T 83/828; Y10T
83/8822
USPC .......... 33/16, 20, 27.01, 227, 228, 262, 263,
33/264, 272, 273, 274, 275 R, 276, 277,
33/278, 280, 281, 282, 283, 284, 285,
33/286, 288, 290, 291, 292, 293, 299,
33/321, 333, 347, 348, 354, 365, 370,
33/371, 381, 382, 384, 389, 391, 397,
33/416, 451, 529, 533, 555.1, 645, 700,
33/761, 1 E, 1 G, 1 H, 1 N, 1 PT, 1 SB,
33/DIG. 1, DIG. 21; 73/170.16; 353/28,
353/42, 50; 356/3.01, 4.08, 5.01, 5.11,
356/5.15, 8, 138, 148, 153, 247, 248,
356/249, 255, 399, 614, 620, 625;
359/626, 664, 708, 727, 813, 822, 837,
359/839; 362/23.18, 23.19, 119, 259,
362/285, 551; 378/163; 382/100;
396/89, 373; 702/94, 159; D10/66
See application file for complete search history.

(56)      References Cited

U.S. PATENT DOCUMENTS

| | | | |
|---|---|---|---|
| 2017/0219693 A1 | 8/2017 | Choiniere et al. | |
| 2017/0310248 A1 | 10/2017 | Kumagai et al. | |
| 2019/0331486 A1* | 10/2019 | Carlén | G01C 1/04 |
| 2020/0128201 A1 | 4/2020 | Glimm | |
| 2020/0355499 A1* | 11/2020 | Hinderling | G01C 1/04 |

* cited by examiner

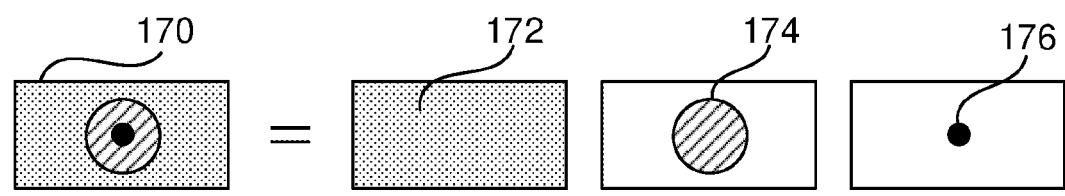
FIG. 2
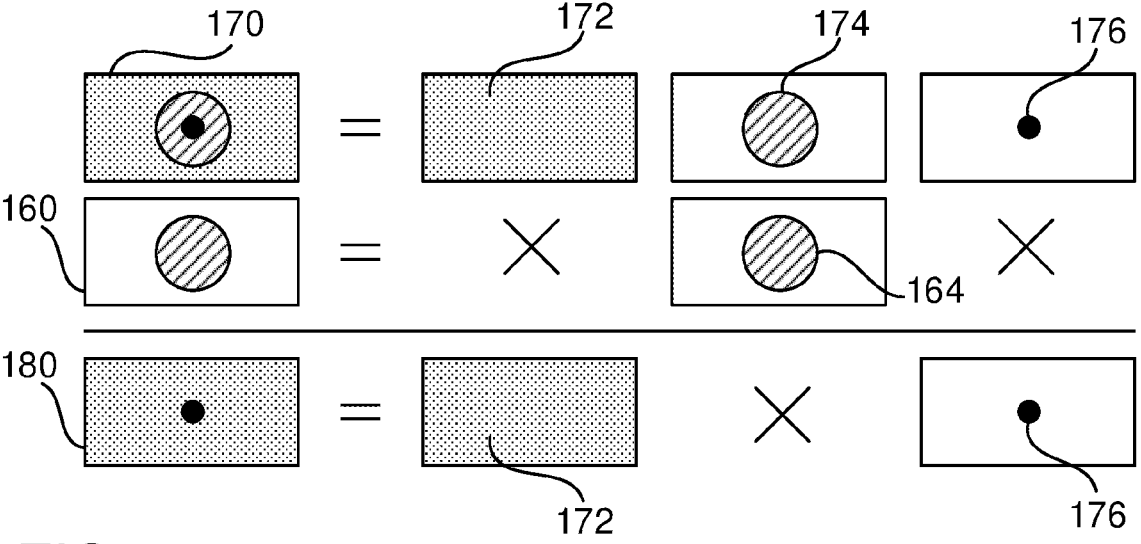
FIG. 3a
FIG. 3b

650

652

654

656

670

672

674

676

678

METHOD FOR OPERATING A GEODETIC INSTRUMENT, AND RELATED GEODETIC INSTRUMENT

CROSS-REFERENCE TO RELATED APPLICATIONS

This application is a continuation of International Application No. PCT/EP2020/077354, filed Sep. 30, 2020, the entire contents of which are incorporated herein by reference in its entirety for all purposes.

TECHNICAL FIELD

The inventive concept described herein generally relates to geodetic instruments.

BACKGROUND

Optical instruments, such as geodetic instruments, are commonly used for measuring a position of an object to obtain information, such as horizontal and vertical angles and distances. Newer instruments are often provided with an electronic imaging device, e.g. a camera, to acquire digital images of the object.

A conventional surveying instrument comprises a telescope system for sighting an object which can then be imaged on a camera behind the telescope system. Further, such an instrument may comprise a distance measurement unit to measure a distance to the object sighted by the telescope system. The viewing angle of the telescope system is generally very small, e.g. 1 to 2 degrees, and a user has to position the surveying instrument and adjust the optics of the telescope system so that the object to be sighted and to be measured is exactly in the small field of view of the telescope system and, optimally, on the optical axis of the telescope system, e.g. to measure a distance to the object.

As more functions are added to the surveying instrument, the complexity of the optical setup and electronic control of the instrument increases. Hence, there is a need to more efficiently implement an aiming aid to geodetic instruments.

SUMMARY OF THE INVENTION

It is an object of the present inventive concept to mitigate, alleviate or eliminate one or more of the above-identified deficiencies in the art and disadvantages singly or in combination.

In general, the inventive concept is based on the realization that an imaging device and an optical source for assisting a user in aiming at a target in a scene can share a common optical channel in a geodetic instrument. Such an arrangement achieves a compact optical setup. As a result, calibration of the apparatus and transforming directions with respect to the center of the apparatus can be simplified.

Furthermore, it has also been realized that a geodetic instrument having an imaging device and an optical source sharing a common optical channel may suffer from crosstalk occurring in the common optical channel. The crosstalk is a result of internal arrangement of features in the geodetic instrument, and hence the crosstalk will be generally unaffected by external conditions, such as ambient light variations or light reflected from the optical source by a target in the scene. Such crosstalk may decrease the quality of image data collected by the imaging device, which can interfere with measurements, cause difficulties in identification of features in images, and lessen user experience. Crosstalk may take any shape and form as detected by an imaging device of the geodetic instrument. Furthermore, crosstalk may be located at any position with respect to the pixels of the imaging device. The shape and form of the crosstalk may depend on the beam profile of the optical source, and/or optics of the geodetic instrument. Preferably, the crosstalk does not saturate the imaging device in any pixel with respect to intensity. This can for example be achieved by adjusting the exposure time of the imaging device.

A solution to the above-specified problems should preferably allow the imaging device and the optical source to appear unaffected, or minimally affected, in their respective operation as experienced by a user of the geodetic instrument. Hence, the present disclosure also aims to improve geodetic instruments with respect to crosstalk occurring in a common optical channel.

According to a first aspect of the inventive concept, these and other objects are achieved in full, or at least in part, by a method for operating a geodetic instrument comprising an optical source for assisting a user in aiming at a target in a scene by emitting optical pulses forming a spot at the target, and an imaging device, wherein the imaging device and the optical source share a common optical channel within the geodetic instrument, the method comprising: capturing a first image of a scene with the optical source turned on; obtaining a reference image from at least the first image, wherein contribution from the scene is suppressed, the reference image representing crosstalk occurring in the common optical channel; capturing a second image with the optical source turned on; and processing the second image with the reference image for removing crosstalk from the second image.

Hereby, a simpler and more compact optical setup is achieved, wherein the optical source can operate to assist in aiming at a target in a scene, and the imaging device can operate to capture images of the scene without crosstalk, occurring in the common optical channel shared with the imaging device. The phrase "removing contribution from the crosstalk" is to be understood as comprising decreasing, diminishing, partly removing, or completely removing said contribution crosstalk. Similarly, "removing contribution from the spot" is to be understood as comprising decreasing, diminishing, partly removing, or completely removing said contribution from the spot.

In some cases, contribution from the spot in the second image may be overcompensated by processing with the reference image, if the reference image represents a spot having e.g. a higher intensity and/or a broader distribution than the spot of the second image.

The obtained reference image represents crosstalk occurring in the common optical channel, and may further represent the spot. Hence, in some embodiments, when processing the second image with the reference image, crosstalk and contribution from the spot in the second image may be removed. The second image will thus comprise only contribution from the scene. Displaying the second image to a user on a display device will allow the user to view the scene. Furthermore, a user may be able to directly view a spot generated by the optical source. Here, "directly view" is used in the sense that a user may be able to directly view the spot on an object of the scene, i.e. with the user's eyes, independently from any data generated by the geodetic instrument.

As will be understood from the present disclosure, the reference image may in some embodiments be obtained simply by capturing the first image under specific conditions. Such specific conditions may comprise one or several of aiming the geodetic instrument towards a scene and/or towards a target having preferred properties with respect to reflected ambient light and/or reflected light from the optical source. Hence, it is to be understood that "capturing a first image" and "obtaining a reference image" may in fact be performed in a single action.

In the context of the present disclosure, a "scene" is to be understood as objects reflecting ambient light to the imaging device, such as a building, landscape, or other object.

In the context of the present disclosure, a "target" is to be understood as an object within the scene which may be impinged by light emitted by the optical source. A target may for example be a prism, a building, landscape, or other object.

In some embodiments, contribution from the spot may be suppressed in the reference image, by aiming the geodetic instrument such that the optical source is directed towards a target which does not reflect light emitted by the optical source back towards the imaging device when capturing the first image. Contribution from the spot may also be suppressed in the reference image by aiming the geodetic instrument such that the optical source does not generate a corresponding spot in the first image. A reference image obtained under such conditions may be obtained before the geodetic instrument is provided to an end user, i.e. as a pre-calibration.

Hereby, the reference image may, substantially, represent only the crosstalk occurring in the common optical channel. Thus, when processing the second image with the reference image, crosstalk in the second image can be removed.

In some embodiments, contribution from the scene is suppressed by providing a dark scene or a scene which does not reflect ambient light towards the imaging device. A reference image obtained under such conditions may be obtained before the geodetic instrument is provided to an end user, i.e. as a pre-calibration.

In some embodiments, the method further comprises capturing a third image of the scene with the optical source turned off; and generating a difference image based on the first and third images, wherein contribution from the scene is suppressed; wherein the reference image is based on the difference image.

A difference image of the first and third images will, preferably, remove the contribution from the scene, thus generating an image with contribution only from the crosstalk, and, in some cases, the spot. By aiming the geodetic instrument such that the optical source, when turned on, does not generate a spot, also the contribution from the spot can be removed from the difference image.

In some embodiments, the method may further comprise capturing a fourth image of a second scene with the optical source turned on, capturing a fifth image of the second scene with the optical source turned off, generating a second difference image of the fourth and fifth images, wherein contribution from the second scene is suppressed, determining a lowest registered intensity level of each pixel of the imaging device among the first and second difference images, wherein the reference image is based on the first and second difference images using the determined lowest registered intensity level for each respective pixel of the imaging device.

Hereby, the reference image may be improved by updating the reference image with the lowest registered intensity level of each pixel of the imaging device among at least a first and a second difference image. It has been realized by the inventor that the lowest registered intensity level of each pixel of the imaging device, in a difference image, will achieve a more accurate representation of crosstalk in the geodetic instrument. Over time, additional difference images may be compared, and the lowest registered intensity level for each respective pixel of the imaging device among all difference images, including the previously generated difference images and the additional difference images, should preferably accurately represent the crosstalk occurring in the common optical channel.

In some embodiments, the method further comprises capturing additional images with the optical source turned on, the additional images and the first image forming a plurality of images; wherein obtaining the reference image comprises: determining a lowest registered intensity level of each pixel of the imaging device among the plurality of images; and obtaining the reference image using the determined lowest registered intensity level for each respective pixel of the imaging device. Each image in the additional images may be of a different scene.

It has been realized by the inventor that the lowest registered intensity level of each pixel of the imaging device, among a plurality of images, may provide an accurate estimate of crosstalk in the geodetic instrument. Over time, the lowest registered intensity level for each respective pixel of the imaging device among all images should preferably accurately represent the crosstalk occurring in the common optical channel. Preferably, one or more of the plurality of images will capture a dark scene or a scene which does not reflect ambient light towards the imaging device, or at least a partially dark scene or a scene which, in some parts, does not reflect ambient light towards the imaging device.

The reference image may also be updated even after it has been obtained. Additional images may be captured after the reference image has been obtained, and if a lowest registered intensity level of a pixel of the imaging device, among the additional images, is lower than a registered intensity level of a corresponding pixel in the reference image, the corresponding pixel in the reference image may be updated with the lower registered intensity level. Likewise, this procedure can be applied to the embodiment wherein several difference images are compared, mutatis mutandis.

According to a second aspect of the inventive concept, these and other objects are achieved in full, or at least in part, by a method for operating a geodetic instrument comprising an optical source for assisting a user in aiming at a target in a scene by emitting optical pulses forming a spot at the target, and an imaging device, wherein the imaging device and the optical source share a common optical channel within the geodetic instrument. The method comprises: capturing a plurality of images with the optical source turned on; determining a lowest registered intensity level of each pixel of the imaging device among the plurality of images; obtaining a reference image using the determined lowest registered intensity level for each respective pixel of the imaging device, the reference image representing crosstalk occurring in the common optical channel. The method further comprises capturing a to-be processed image with the optical source turned on; and processing the captured to-be processed image with the reference image for removing crosstalk from the to-be processed image.

By processing the captured to-be processed image, a processed image may be obtained, wherein crosstalk occurring in the common optical channel may be diminished, decreased, or removed.

As discussed in relation to the first aspect, it has been realized by the inventor that the lowest registered intensity level of each pixel of the imaging device, among a plurality of images, may provide an accurate estimate of crosstalk in the geodetic instrument. Over time, the lowest registered intensity level for each respective pixel of the imaging device among all should preferably accurately represent the crosstalk occurring in the common optical channel. Preferably, one or more of the plurality of images will capture a dark scene or a scene which does not reflect ambient light towards the imaging device, or at least a partially dark scene or a scene which, in some parts, does not reflect ambient light towards the imaging device.

The reference image may also be updated even after it has been obtained. Additional images may be captured after the reference image has been obtained, and if a lowest registered intensity level of a pixel of the imaging device, among the additional images, is lower than a registered intensity level of a corresponding pixel in the reference image, the corresponding pixel in the reference image may be updated with the lower registered intensity level.

According to a third aspect of the inventive concept, these and other objects are achieved in full, or at least in part, by a geodetic instrument comprising: an optical source for assisting a user in aiming at a target in a scene by emitting optical pulses forming a spot at the target; an imaging device configured to capture images of the scene using a frame sequence; wherein the imaging device and the optical source share a common optical channel within the geodetic instrument; and a processing unit configured to operate the geodetic instrument in accordance with a method as defined in any embodiment of the first and second aspects.

In some embodiments, the optical source is an infrared laser, and the imaging device is an infrared camera or a thermal imaging camera.

In some embodiments, the optical source is a laser in the visible spectrum, and the imaging device is configured to detect visible light.

The optical source may be the optical source of an electronic distance measurement unit, or a laser pointer, of the geodetic instrument. The optical source may be a semiconductor laser, or a LED, with a rating in the mW range.

A feature described in relation to one aspect may also be incorporated in other aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. Further, the use of terms "first", "second", and "third", and the like, herein do not denote any order, quantity, or importance, but rather are used to distinguish one element from another. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of the present inventive concept, with reference to the appended drawings, wherein:

FIG. 2 schematically illustrates an image captured by a geodetic instrument;

FIGS. 3*a* and 3*b* schematically illustrate processing of an image with a reference image;

The figures are not necessarily to scale, and generally only show parts that are necessary in order to elucidate the inventive concept, wherein other parts may be omitted or merely suggested.

DETAILED DESCRIPTION

The inventive concept generally relates to the optical functions of a geodetic instrument, e.g. for surveying. In particular, operation of the geodetic instrument according to the inventive concept is advantageous in geodetic instruments having a particular optical setup, as will be further described below with reference to FIGS. 1*a*, 1*b* and 1*c*. Such a geodetic instrument will allow to easily integrate different functional modules into the geodetic instrument over simple interfaces so that several optical paths overlap at least along a lens arrangement. Therefore, the optical paths may have the same lenses of the lens arrangement in common. In more detail, the separation of the optics of the lens arrangement from the distance measuring unit, imaging unit and tracker provides flexibility in the design of the geodetic instrument, wherein the clear and simple interfaces allow adding or replacing such functional modules.

In short, in one embodiment, the geodetic instrument comprises a lens arrangement; an imaging unit configured to obtain an image of at least a part of a target; an optical source, arranged for assisting a user in aiming at a target in a scene and/or arranged as part of a distance measuring unit (or electronic distance measurement unit, EDM unit) configured to measure a distance to the target along the optical axis of the optical source; and a beam splitter/combiner. The beam splitter/combiner combines parts of the optical paths of the imaging unit and the optical source. The optical source may hence be part of a distance measuring unit. It is to be understood however that optical pulses emitted by the optical source are not necessarily distance measuring light or distance measuring pulses. The present disclosure although referring to distance measuring light, should be understood to also comprise embodiments wherein the optical source is configured for assisting a user in aiming at a target. In other words, the optical source may be used as a laser pointer.

In particular, the optical paths are arranged so that the optical axis of the imaging unit and the optical axis of the optical source are coaxial, i.e. parallel and overlapping, with the optical axis of the lens arrangement at least between the lens arrangement and the beam splitter/combiner.

Figure 1A:
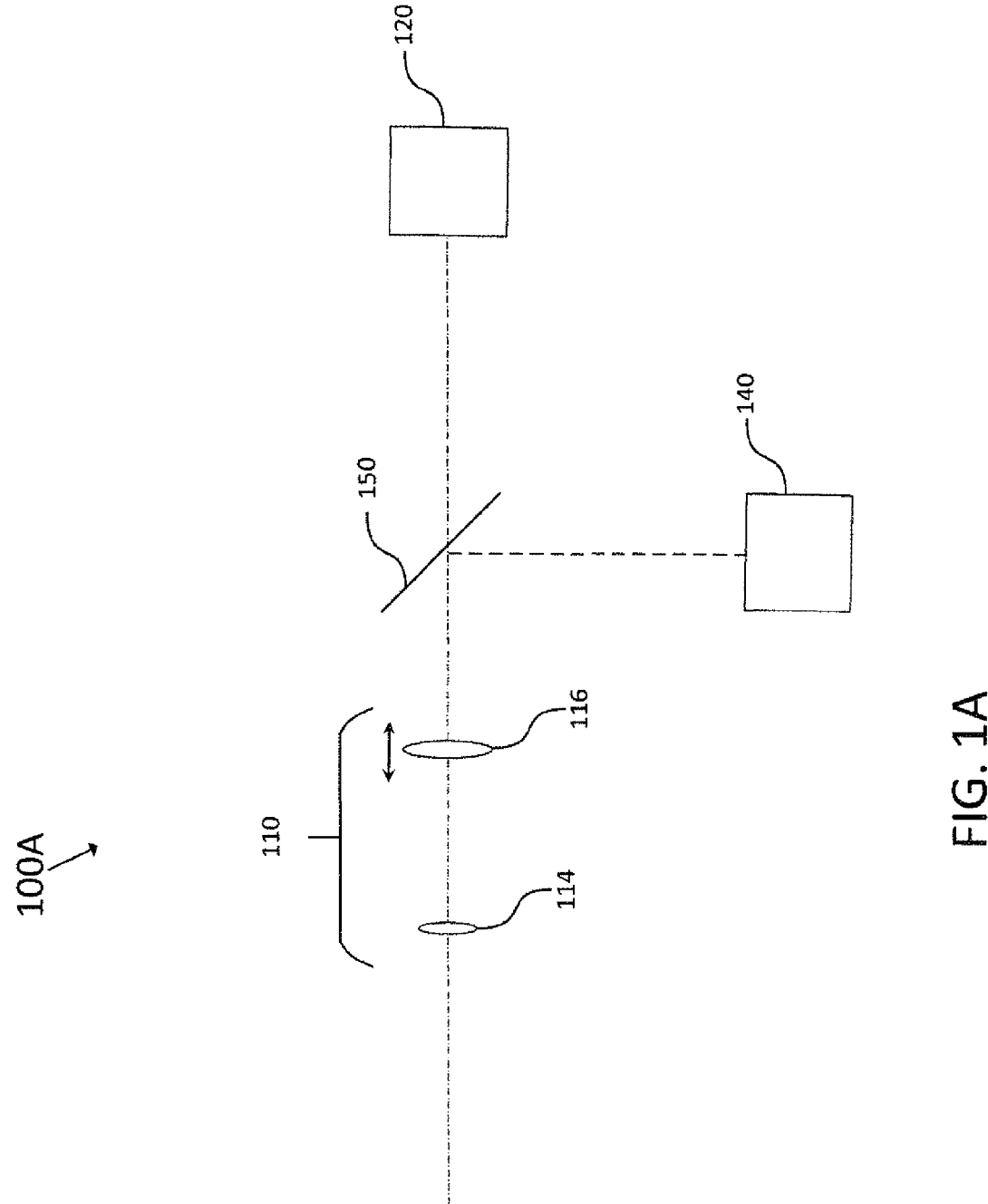
FIG. 1*a* schematically illustrates one embodiment of a geodetic instrument.

FIG. 1*a* illustrates elements of a geodetic instrument 100A according to an embodiment. The geodetic instrument 100A comprises a lens arrangement 110, an imaging unit 120, an optical source 140 and a beam splitter/combiner 150.

The lens arrangement 110 is provided to sight an object which is a target, such as a reflector. The optical arrangement 110 includes at least one movably arranged focus lens element 116 for focusing so as to sight the object. For example, the focus lens element may be an individual or compound focusing lens which is moved manually or automatically to produce in focus/out of focus images of the object which may be viewed through an ocular constituting a simple imaging unit. The lens arrangement 110 may be part of a telescope known in the art of surveying, and may comprise several optical lenses, such as lenses 114 and 116, so as to enable focusing and zooming.

The imaging unit 120 is configured to obtain an image of at least a part of the object sighted by the lens arrangement 110. The imaging unit 120 may be a simple lens or an ocular, a.k.a. eyepiece, so that an image can be obtained in the eye of the user. Alternatively, the imaging unit 120 may be a combination of an electronic imaging device, a micro-display and an ocular so that an image can be recorded and viewed conventionally by eye through an ocular. Preferably, the imaging unit 120 is an electronic imaging device, for example, a two-dimensional array of sensor elements capable of generating image information with a number of pixels generally corresponding to the number of elements of the array, such as a charge-coupled device (CCD) camera or a metal-oxide semiconductor (CMOS) camera. Such a sensor array may be composed of 1000×1000 sensor elements or more to generate digital images with 106 image pixels (1 megapixel) or more. However, also smaller sensor arrays are feasible, for example, composed of 480×750 sensor elements, for example. Alternatively, the sensor array may be composed of avalanche photodiodes (APD) forming an APD array. The optical source 140 may be configured to measure a distance to the object along the optical axis of the optical source 140, which constitutes an optical measurement axis. For example, the optical source 140 may use an electronic distance measurement (EDM) to obtain measurement values about the distance. In one example, the optical source comprises a distance measurement unit 140 that includes a coherent light source, such as an infrared laser or another suitable laser, e.g. emitting in a red-wavelength range. The distance measuring unit may preferably include a fast reflec-tor-less working EDM. Conventionally, collimated light is sent out in a radial direction from the surveying apparatus 100A to perform a distance measurement by using a pulse method or phase method as known in the art. Further, the intensity of a received EDM-Signal, i.e. the back-reflected signal of an electro-optical distance measurement, could also be used to obtain information about the distance to the reflecting object.

In FIG. 1a, a beam splitter/combiner 150 is provided and configured to combine a part of the optical imaging path of the imaging unit 120 and a part of the optical distance measuring path of the optical source 140 so that the optical axis of the imaging unit 120 and the optical axis of the optical source 140 are coaxially arranged with the optical axis of the lens arrangement at least between the lens arrangement 110 and the beam splitter/combiner 150.

An optical axis may be regarded as an imaginary line that defines the path along which light propagates through the system, up to a first approximation. For a system composed of simple lenses and mirrors, an optical axis passes through the center of curvature of each surface and coincides with the axis of rotational symmetry. The optical path may be regarded as the path that light takes when traversing an optical system, such as the lenses of the lens arrangement 110. The optical (beam) path is usually limited by a three-dimensional volume having the optical axis as an axis of rotational symmetry, in which light may travel.

The optical axis of the imaging unit 120 is shown by the dot-and-dash line and the optical axis of the optical source 140 is shown by the dashed line. No preferred direction is given by the lines (optical reciprocity) but it may be considered that light to be imaged on the imaging unit 120 travels from left to right. The beam splitter/combiner 150 combines these lines to obtain an overlap of the optical axes on the left part of the beam splitter/combiner 150 in FIG. 1a. Since these axes are parallel and overlapping, i.e. coaxial, to each other, and additionally parallel and overlapping to the optical axis of the lens arrangement 110, they are also regarded coaxially arranged with respect to the optical axis of the lens arrangement 110.

In particular, the optical setup and especially the beam splitter/combiner 150 are chosen such that the optical axis of the lens arrangement 110 corresponds to the overlapping optical axes of the imaging unit 120 and the optical source 140 between the beam splitter/combiner 150 and the lens arrangement 110 as well as along the lens arrangement 110 so that light traveling in the respective optical paths is affected by the lenses 114 and 116 of the lens arrangement. Since the optical axes of the optical source 140 and the imaging unit 120 partly overlap, also the optical paths, i.e. the optical imaging path and the optical distance measuring path, of these units partly overlap when being combined by the beam splitter/combiner 150. In the apparatus, the center of the two-dimensional array of sensor elements as imaging unit and the center of the tracking unit do not need to coincide with the optical axis of the lens arrangement 110. For example, in a calibration step, the center can be defined on the two-dimensional array of sensor elements as the point where the optical axis coincides with the array.

It is understood that a coaxial arrangement of two or more optical axes is basically a theoretical assumption, since in practice the optical axes will usually not exactly overlap and point in the exact same direction but will overlap within some small error range. Thus, for ease of explanation, we assume axes deviations of less than +/−0.2° still as coaxial. Typical alignment errors are in the order of +/−0.1° which can be corrected later in calibration by software.

Looking at FIG. 1a from a different perspective, according to the optical reciprocity principle, light originating on the left side in FIG. 1a, and thus entering the lens arrangement 110 from the left, will be split by the beam splitter/combiner 150. Therefore, describing that an optical path is split into two optical paths by the beam splitter/combiner (looking from left to right) is technically the same as describing that two optical paths are combined by the beam splitter/combiner (looking from right to left).

In a simple case, a semi-transparent mirror may be used as beam splitter/combiner dividing the incoming light into two parts, e.g. 50:50, one part reaching the imaging unit 120 and the other part reaching the optical source 140. Undesired distance measuring light in the imaging channel may then be filtered before it hits the imaging unit 120. In practice, however, a dichroic mirror or prism, i.e. a mirror or prism which is transparent for one wavelength range and reflective for the other, is used. This wavelength selectivity may be achieved with dichroic filters/films using the principle of thin-film interference. Using a dichroic mirror or dichroic prism thus allows using a large percentage of reflected and transmitted light, respectively.

Accordingly, depending on the light direction and the wavelength, in addition to its configuration to combine light beams, the beam splitter/combiner 150 is also configured to split light reflected from the object traversing the lens arrangement in imaging light along the optical imaging path and in distance measuring light along the optical distance measuring path.

It is clear from the above that the optical paths and optical axes are independent of the light traveling direction so that "splitting" and "combining" is merely used to better explain the optical layout. In particular, the imaging unit in these examples only receives light and does not send out any light so that the beam splitter/combiner does not combine light from the imaging unit and the optical source but is config- ured with an optical function that could do so, since light entering the geodetic instrument through the lens arrange- ment is split in different channels by the beam splitter/ combiner. In other words, the optical function of the beam splitter/combiner is to combine different paths from its right side to overlap on its left side.

In one example, a laser diode of the optical source 140 may emit light in the red range of approximately 660 nm (or 635 nm) and the imaging unit 120 may image a scenery including an object reflecting visible wavelengths. Accord- ingly, if a dichroic mirror with a cut-off wavelength of approximately 620 nm, i.e. wavelengths larger than 620 nm are reflected, is provided (alternatively a notch filter block- ing light around 635 nm), distance measuring and imaging may be achieved in separate channels with hardly any loss in intensity. Using a dichroic prism design further allows to glue a camera chip of an imaging unit directly onto parts of the prism so that a highly compact structure is achieved which is largely insensitive to temperature changes and external shocks while mechanic components for attaching and aligning a camera chip can be saved.

Additional reliability of the measurements of the survey- ing apparatus can be achieved if the lens 116 in the lens arrangement 110 facing the beam splitter/combiner has a convex side, e.g. a plano-convex or a bi-convex lens, which faces the beam splitter/combiner. As a result, reflections from this lens of distance measuring light from the optical source 140 may not be reflected back to the distance measuring unit 140 so as to avoid crosstalk which could lead to the detection of signals not coming from the actual target (object). Furthermore, anti-reflection coatings on the lenses of the lens arrangement may also reduce crosstalk. When using a prism as the beam splitter/combiner 150, an inter- mediate focus should be placed outside and not inside the prism and the surface(s) of the prism on which light is incident may be slightly tilted with respect to an orthogonal direction so that light is not fully orthogonally incident thereon. Furthermore, air gaps between individual prisms for total reflection can be provided where appropriate.

Figure 1B:
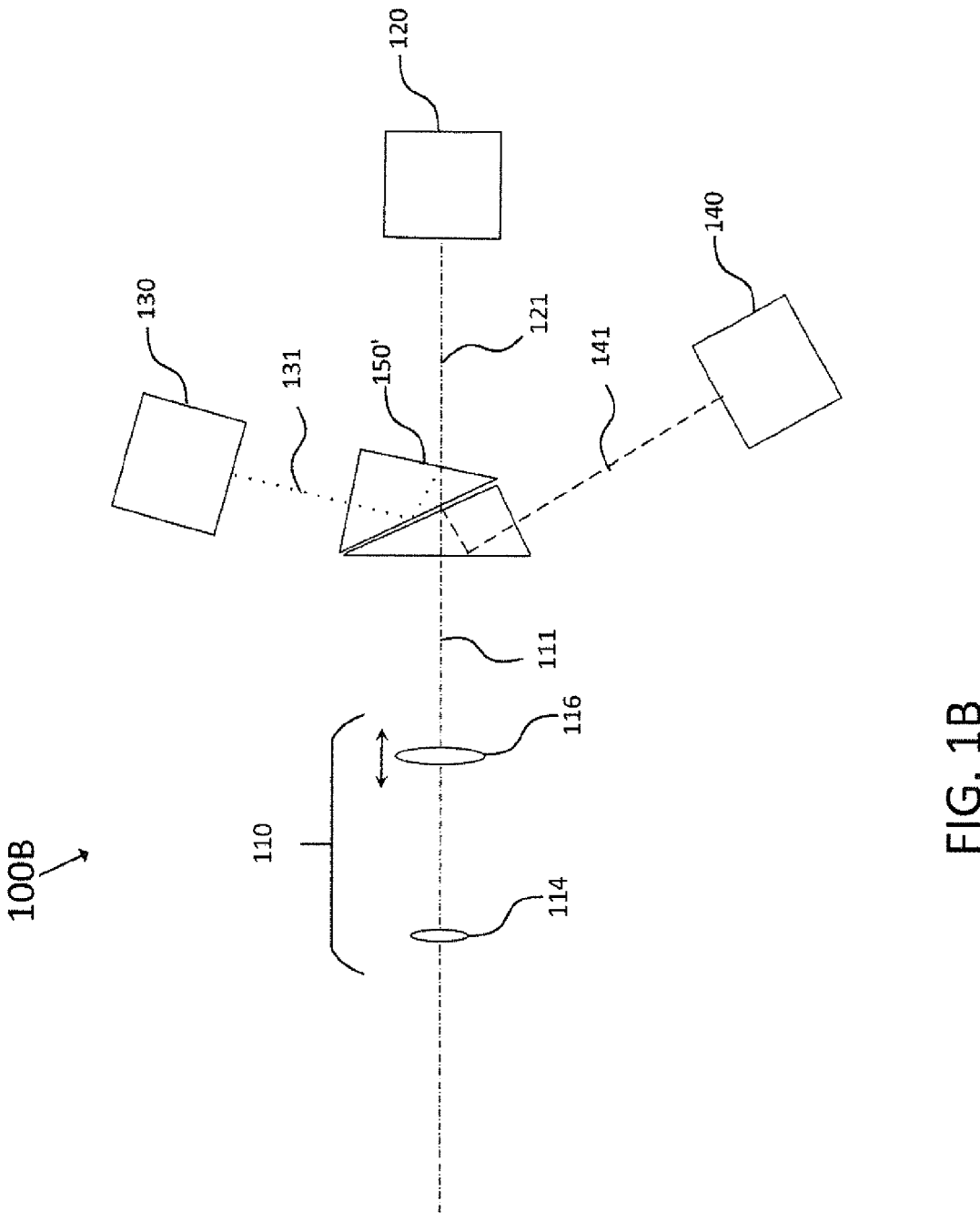
FIG. 1*b* schematically illustrates one embodiment of the geodetic instrument.

In FIG. 1b, another embodiment of a geodetic instrument is provided which further builds on the geodetic instrument 100A of FIG. 1a. Specifically, the geodetic instrument 100B comprises the same elements as the geodetic instrument 100A and additionally comprises a tracker 130.

The tracker 130 is configured to track the object, e.g., a triple prism reflector, by using preferably infrared light at a wavelength of 850 nm (or 810 nm). As directly understand- able from FIG. 1b, the beam splitter/combiner 150 of FIG. 1a needs some modification to combine/split the three beam paths of the tracker 130, the imaging unit 120 and the optical source 140, respectively. Thus, the beam splitter/combiner 150' is configured in FIG. 1b to combine a part of the optical tracker path of the tracker 130, a part of the optical imaging path of the imaging unit 120 and a part of the optical source path of the optical source 140 so that the optical axis of the tracker, the optical axis of the imaging unit and the optical axis of the optical source are coaxially arranged with the optical axis of the lens arrangement 110 at least between the lens arrangement and the beam splitter/combiner 150'. Thus, the lens arrangement 110 is shared by the tracking, aiming assist and/or distance measuring and imaging functions.

In more detail, in FIG. 1b, the optical axis of the tracker 130 is shown by the dotted line 131, the optical axis of the imaging unit 120 is shown by a dot-and-dash line 121 and the optical axis of the optical source 140 is shown by the dashed line 141. In FIG. 1b, it is schematically shown how light of these optical axes is reflected and transmitted by the beam splitter/combiner 150' to coincide with the optical axis 111 of the lens arrangement 110.

The prism system shown in FIG. 1b is a multi-channel prism. In particular, the prism system comprises two prisms having wedge shapes. In a preferred embodiment, the beam splitter/combiner 150' comprises at least two wedge shaped prisms and wavelength selective surfaces. A wavelength selective surface is any surface which reflects different wavelengths differently. In the above example of the dichroic mirror (or similar dichroic prism), the dichroic mirror (or dichroic prism) may also comprise a wavelength selective surface. The more optical paths need to be com- bined, the more prisms or mirrors (or combinations thereof) need to be provided. Thus, in a preferred embodiment having three functional modules, such as tracker 130, imag- ing unit 120 and optical source 140, the prism system is made up of two dichroic prisms having dichroic mirror-like surfaces.

The skilled person realizes that instead of the two dichroic prisms shown in FIG. 1b also two dichroic mirrors may be used. Therefore, similar to FIG. 1a, the optical axes of the tracker, optical source and imaging unit can be coaxially arranged with the optical axis of the lens arrangement 110 on the left side of the beam splitter/combiner 150'.

Figure 1C:
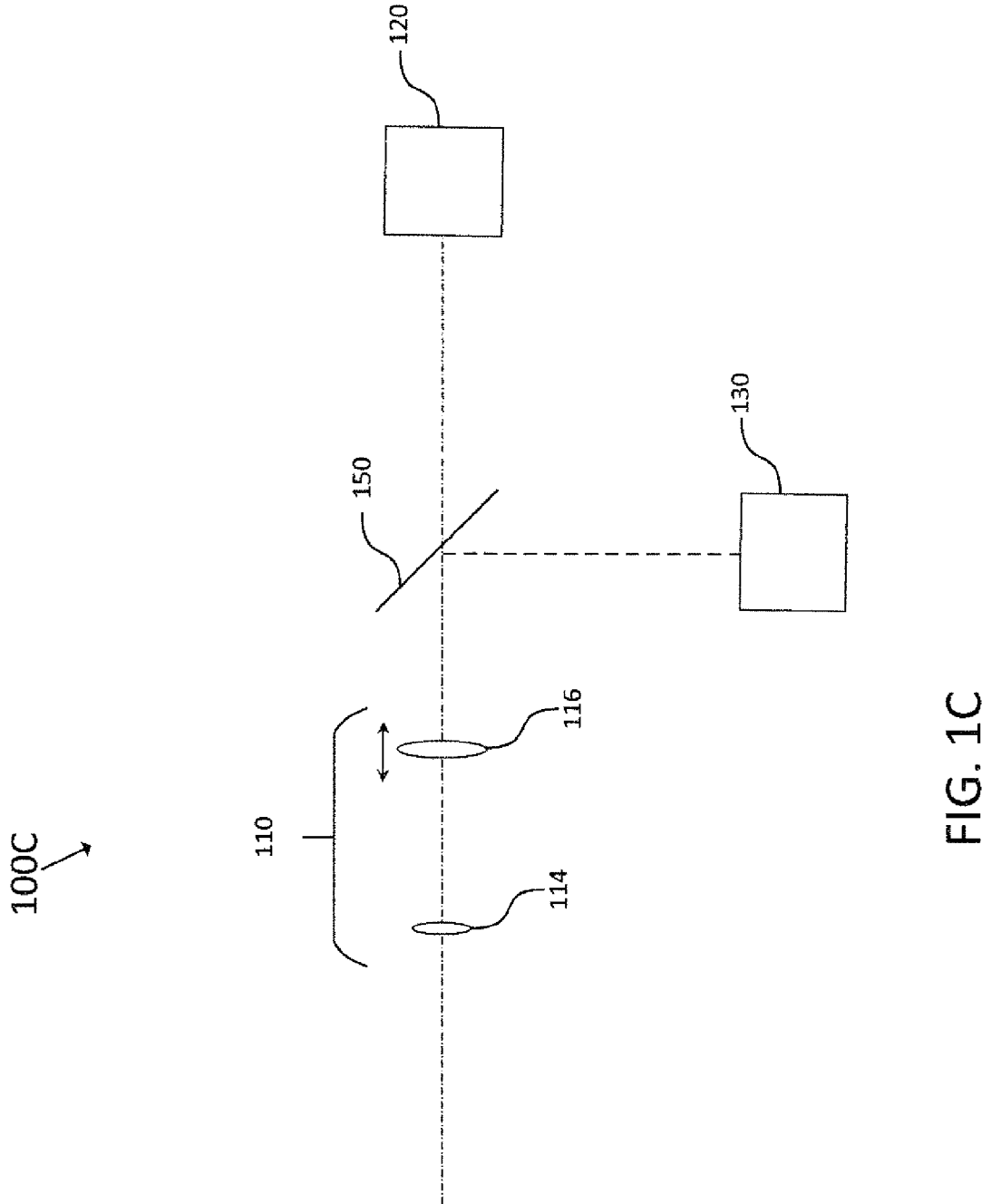
FIG. 1*c* schematically illustrates one embodiment of the geodetic instrument.

FIG. 1C illustrates elements of another example of a geodetic instrument 100C. The geodetic instrument 100C comprises a lens arrangement 110, an imaging unit 120, a tracker 130 and a beam splitter/combiner 150. The geodetic instrument 100C corresponds to the geodetic instrument 100A but the optical source 140 is replaced by the tracker 130, wherein details of the tracker 130 were discussed with respect to FIG. 1b.

FIG. 2 illustrates an image 170 captured by a geodetic instrument comprising an optical source for assisting a user in aiming at a target in a scene by emitting optical pulses forming a spot at the target, and an imaging device. The imaging device and the optical source share a common optical channel within the geodetic instrument, such as for example illustrated in the geodetic instruments shown in FIGS. 1a-1c. The image 170 will hereinafter be referred to as a "second image", to differentiate said image 170 from other images. The second image 170 has been captured with the optical source turned on, and the second image 170 can be said to comprise a scene 172, crosstalk 174 occurring in the common optical channel, and preferably a spot 176 generated by light emitted from the optical source impinging on a target in the scene and reflected back against the target back to the imaging device. It should be noted that FIG. 2 is merely a schematic representation of the second image 170, the scene 172, the crosstalk 174 and the spot 176.

Processing of the second image 170 will now be discussed with reference to FIG. 3a. It should be noted that FIG. 3a is merely a schematic representation of the various features disclosed. In FIG. 3a, the first row illustrates the second image 170 and its components, the second row illustrates a reference image 160 and its components, and the third row illustrates a processed image 180 and its components, resulting from processing the second image 170 with the reference image 160.

The second image 170 comprises a scene 172, crosstalk 174, and preferably a spot 176. A first image of a scene, not necessarily the same scene as in the second image 170, has been captured by the imaging device, with the optical source turned on. A reference image 160 is obtained from at least the first image, wherein contribution from said scene of the first image is suppressed. Furthermore, contribution from the spot has been suppressed in the reference image 160. Hence, the reference image 160 may comprise contribution only from crosstalk 164 occurring in the common optical channel. The crosstalk 164 of the reference image 160 may be substantially identical to the crosstalk 174 present in the second image 170.

By processing the second image 170 with the reference image 160, the crosstalk 174 in the second image 170 may be removed. A processed image 180 may thus be achieved. Since contribution from the spot and the scene have been suppressed in the reference image 160, the reference image 160 comprises only crosstalk 164, and the scene 172 and the spot 174 in the second image 170 will remain in the processed image 180. In other words, processing of the second image 170 with the reference image 160 will remove, or decrease, contribution only from the crosstalk 174.

Referring now to FIG. 3*b*, similarly to what has been discussed in conjunction with FIG. 3*a*, a second image 170 may be processed. It should be noted that also in FIG. 3*b*, the various features disclosed are schematically represented. In FIG. 3*b*, the first row illustrates the second image 170 and its components, the second row illustrates a reference image 160 and its components, and the third row illustrates a processed image 180 and its components, resulting from processing the second image 170 with the reference image 160.

The second image 170 comprises a scene 172, crosstalk 174, and preferably a spot 176. A first image of a scene, not necessarily the same scene as in the second image 170, has been captured by the imaging device, with the optical source turned on. A reference image 160 is obtained from at least the first image, wherein contribution from said scene of the first image is suppressed. Hence, the reference image 160 may comprise contribution only from crosstalk 164 occurring in the common optical channel, and from a spot 166. The contribution from the crosstalk 164 of the reference image 160 may be substantially identical to the contribution from the crosstalk 174 in the second image 170. Similarly, the contribution from the spot 166 of the reference image 160 may be substantially identical to the contribution from the spot 174 in the second image 170.

By processing the second image 170 with the reference image 160, the crosstalk 174 in the second image 170 may be removed. A processed image 180 may thus be achieved. Since contribution from the scene has been suppressed in the reference image 160, the reference image 160 comprises only contribution from crosstalk 164 and from the spot 166, and hence the scene 172 in the second image 170 will remain in the processed image 180. In other words, processing of the second image 170 will remove, or decrease, contribution from the crosstalk 174, and further remove, or decrease, contribution from the spot 166.

However, it has been realized that the contribution from a spot in an image will depend on the distance from the optical source to the target on which light emitted from the optical source impinges. Thus, in case the reference image and the second image are captured with different arrangements of the target, the contribution from the spot in the reference image and the second image may not be identical. Hence, the reference image 160 preferably comprises contribution only from the crosstalk 164, as described in conjunction with FIG. 3*a*.

Figure 4A:
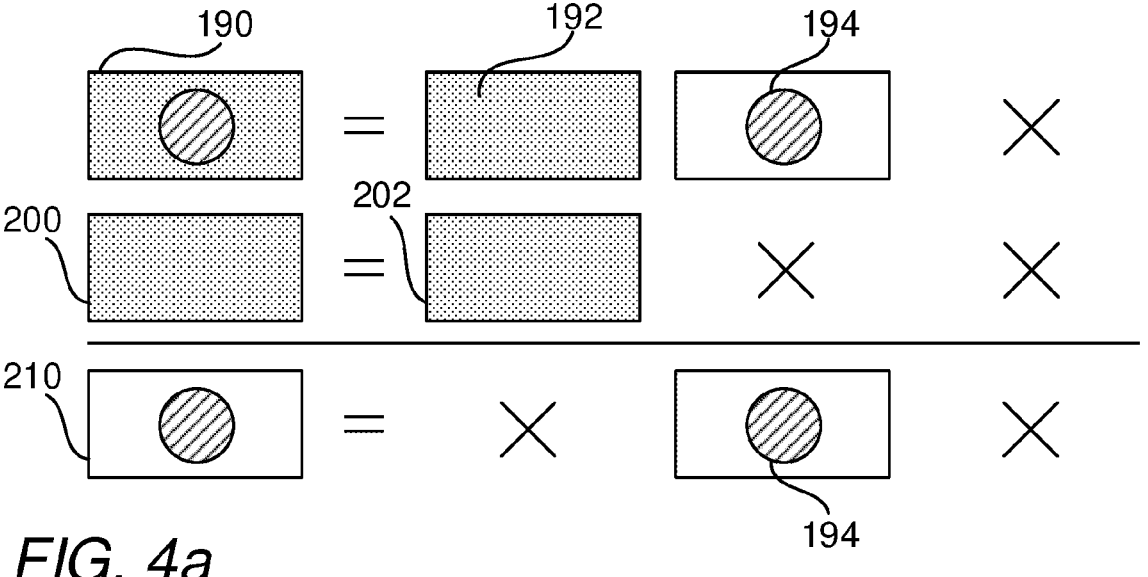
FIGS. 4*a* and 4*b* schematically illustrate generation of difference images.

A process of generating a difference image will now be described with reference to FIG. 4*a*. It should be noted that FIG. 4*a* is merely a schematic representation of the various features disclosed. In FIG. 4*a*, the first row illustrates a first image 190 and its components, the second row illustrates a third image 200 and its components, and the third row illustrates a difference image 210 and its components, generated based on the first image 190 and the third image 200.

The first image 190 comprises a scene 192 and crosstalk 194. Such a first image 190 may for example be captured by suppressing contribution from the spot, e.g. by aiming the geodetic instrument such that the optical source is directed towards a target which does not reflect light emitted by the optical source back towards the imaging device when capturing the first image 190.

A third image 200 of the scene, captured with the optical source turned off, comprises only said scene 202. A difference image 210 can thus be generated based on the first image 190 and the third image 200, comprising contribution only from the crosstalk 194. A reference image can then be based on the difference image 210, and the reference image can be used as described in conjunction with FIG. 3*a*. In other words, the difference image 210 may be the reference image.

As will be understood from the present disclosure, the scene 192 in the first image 190 and the scene 202 in the third image 200 are preferably one and the same scene, being aligned, and/or captured in the same setting with respect to ambient light, such that a difference image of the first image 190 and the third image 200 will result in contribution from the scene 192, 202 being completely erased in the difference image. Furthermore, the scene of the first image 190 and the scene of the third image 200 being denoted with different reference signs in the present disclosure are not to be understood as an indication of these scenes necessarily being different from each other. Preferably, the scene of the first image 190 and the scene of the third image 200 are identical or substantially identical. In some scenarios, the scene of the first image 190 and the scene of the third image 200 may slightly differ in at least some parts. For example, there might be some variations or disturbances, such as variations in ambient light or minor scene changes, because of the time aspect between capture of the first image 190 and capture of the third image 200.

Figure 4B:
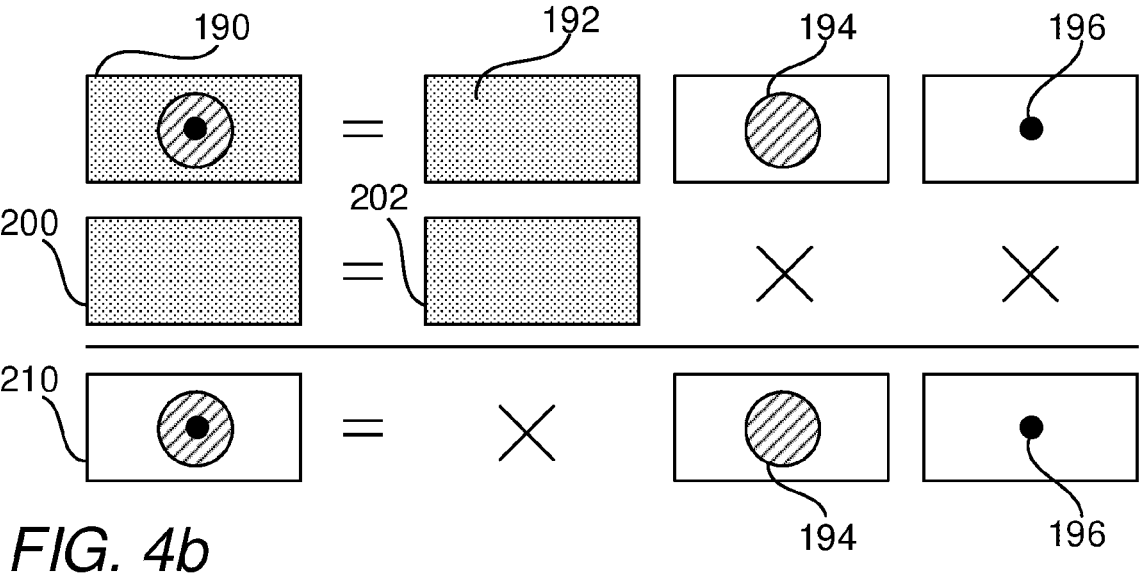

A process of generating a difference image will now be described with reference to FIG. 4*b*. It should be noted that FIG. 4*b* is merely a schematic representation of the various features disclosed. In FIG. 4*b*, the first row illustrates a first image 190 and its components, the second row illustrates a third image 200 and its components, and the third row illustrates a difference image 210 and its components, generated based on the first image 190 and the third image 200.

The first image 190 comprises a scene 192, crosstalk 194, and a spot 196. A third image 200 of the scene, captured with the optical source turned off, comprises only said scene 202. A difference image 210 can thus be generated based on (or using) the first image 190 and the third image 200, by subtracting the second image 200 from the first image 190, and the difference image 210 comprises contribution only from the crosstalk 194 and the spot 196. A reference image can then be based on the difference image 210, and the reference image can be used as described in conjunction with FIG. 3*b*. In other words, the difference image 210 may be the reference image.

As will be understood from the present disclosure, the scene 192 in the first image 190 and the scene 202 in the third image 200 are preferably one and the same scene, being aligned, and/or captured in the same setting with respect to ambient light, such that a difference image of the first image 190 and the third image 200 will result in contribution from the scene 192, 202 being completely erased in the difference image. Furthermore, the scene of the first image 190 and the scene of the third image 200 being denoted with different reference signs in the present disclosure are not to be understood as an indication of these scenes necessarily being different from each other.

Figure 5A:
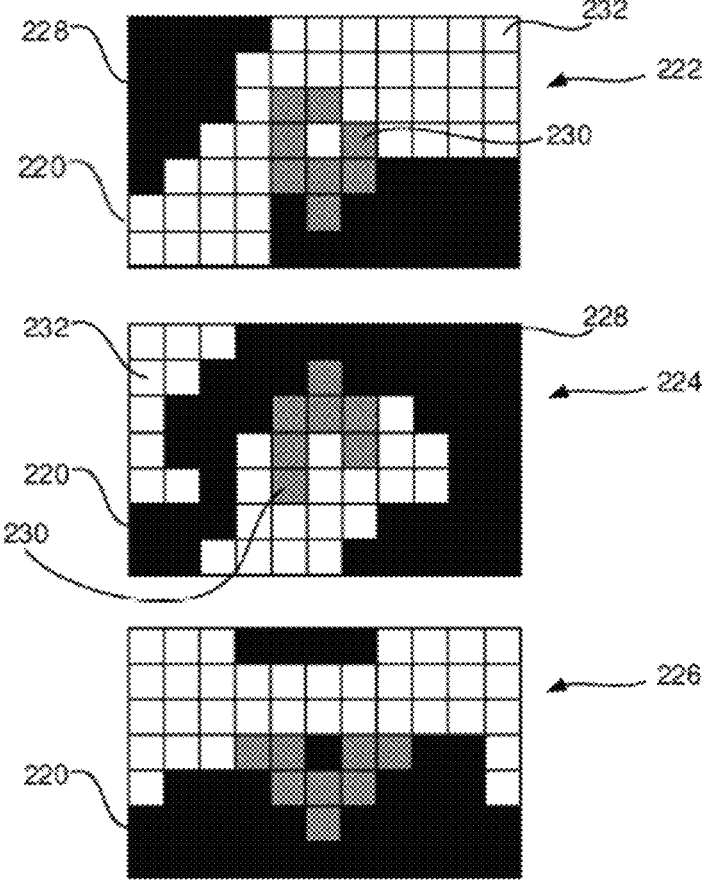
FIGS. 5*a* and 5*b* schematically illustrate pixels of an imaging device in a geodetic instrument, and attainment of a reference image.
Figure 5B:
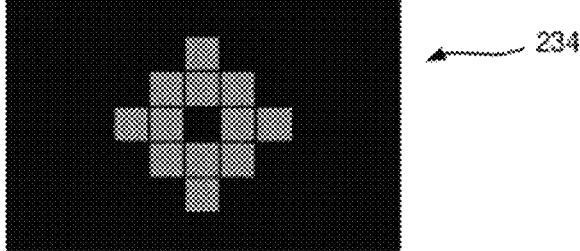

Referring now to FIGS. 5*a* and 5*b*, pixels of an imaging device in a geodetic instrument are schematically illustrated. A pixel may register an intensity level pertaining to the intensity of light impinging at said pixel. For the sake of clarity, in the schematic figure, a pixel may register either a low intensity level (depicted by a black pixel in the figures), a medium intensity level (depicted by a gray pixel in the figures), or a high intensity level (depicted by a white pixel in the figures). It is to be understood that a low intensity level may correspond to an intensity level of zero, i.e. no registered light. Furthermore, as will be readily understood from the present disclosure, the inventive concept described herein may be applied to an imaging device having pixels with any number of possible registered intensity levels.

In some embodiments, a method for operating a geodetic instrument comprises capturing a plurality of images with the optical source turned on. With reference to FIG. 5*a*, a first image 222, a second image 224, and a third image 226 of said plurality of images are illustrated. Each of said images 222, 224, 226 comprises a plurality of pixels, corresponding to pixels of the imaging device.

The first image 222 comprises a plurality of pixels 220. In the first image 222, some of the plurality of pixels 220 have registered a low intensity level, thus being low intensity level pixels 228, other pixels have registered a medium intensity level, thus being medium intensity level pixels 230, and other pixels have registered a high intensity level, thus being high intensity level pixels 232.

Likewise, the second image 224 comprises a plurality of pixels 220. The second image 224 also comprises low intensity level pixels 228, medium intensity level pixels 230, and high intensity level pixels 232. However, depending on various conditions, such as the aim of the geodetic instrument, the scene, the target in the scene to be observed, ambient light, etc., a pixel among the plurality of pixels 220 may register a different intensity level for the second image 224 compared to the first image 222. Similarly, the third image 226 comprises a plurality of pixels 220, some of which may register a different intensity level as compared to the first image 222 and/or the second image 224.

A lowest registered intensity level of each pixel of the imaging device among the plurality of images, i.e. the first image 222, the second image 224 and the third image 226, may be determined. A reference image can then be obtained using the determined lowest registered intensity level for each respective pixel of the imaging device. A reference image 234 using the determined lowest registered intensity level for each respective pixel of the imaging device among the first image 222, the second image 224 and the third image 226 is illustrated in FIG. 5*b*. As can be seen, the lowest registered intensity level of each pixel, i.e. the reference image, here corresponds to crosstalk occurring in the common optical channel. Such a reference image 234 may be used to process an image captured with the optical source turned on to remove crosstalk from the image.

Figure 6A:
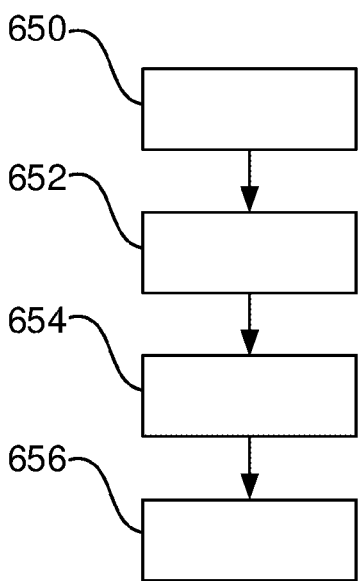
FIGS. 6*a* and 6*b* schematically illustrate, in flowchart diagrams, methods for operating a geodetic instrument.
Figure 6B:
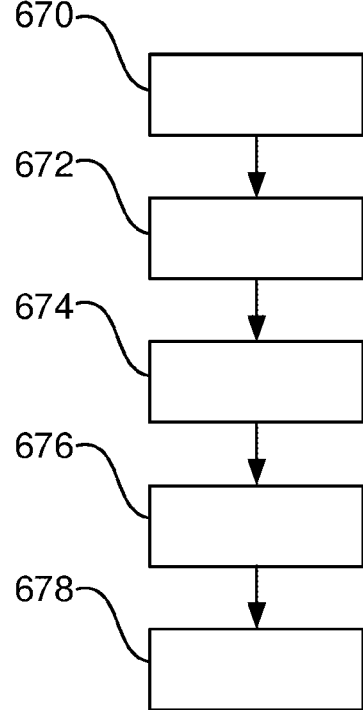

Methods for operating a geodetic instrument according to the inventive concept will now be described with reference to FIGS. 6*a* and 6*b*. It is emphasized that some method features are not necessarily processes that are delimited in time or separate from each other, and more than one 'process feature' may be performed at the same time in a parallel fashion.

One method comprises capturing 650 a first image of a scene with the optical source turned on; obtaining 652 a reference image from at least the first image, wherein contribution from the scene is suppressed, the reference image representing crosstalk occurring in the common optical channel; capturing 654 a second image with the optical source turned on; and processing 656 the second image with the reference image for removing crosstalk from the second image.

One method comprises capturing 670 a plurality of images with the optical source turned on; determining 672 a lowest registered intensity level of each pixel of the imaging device among the plurality of images; obtaining 674 a reference image using the determined lowest registered intensity level for each respective pixel of the imaging device, the reference image representing crosstalk occurring in the common optical channel; capturing 676 a to-be processed image with the optical source turned on; and processing 678 the captured to-be processed image with the reference image for removing crosstalk from the to-be processed image.

As is readily appreciated by the person skilled in the art, many modifications and variations may be devised given the above description of the principles of the inventive concept. It is intended that all such modifications and variations be considered as within the scope of the inventive concept, as it is defined in the appended patent claims.

The invention claimed is:

1. A method for operating a geodetic instrument comprising an optical source for assisting a user in aiming at a target in a scene by emitting optical pulses forming a spot at the target, and an imaging device, wherein the imaging device and the optical source share a common optical channel within the geodetic instrument, the method comprising:

capturing a first image of a scene with the optical source turned on;

obtaining a reference image from at least the first image, wherein contribution from the scene is suppressed, the reference image representing crosstalk occurring in the common optical channel;

capturing a second image with the optical source turned on; and processing the second image with the reference image for removing crosstalk from the second image.

2. The method according to claim 1, wherein contribution from the spot is suppressed in the reference image by aiming the geodetic instrument such that the optical source is directed towards a target which does not reflect light emitted by the optical source back towards the imaging device when capturing the first image.

3. The method according to claim 1, wherein contribution from the scene is suppressed by providing a dark scene or a scene which does not reflect ambient light towards the imaging device.

4. The method according to claim 1, further comprising:

capturing a third image of the scene with the optical source turned off; and generating a difference image based on the first and third images, wherein contribution from the scene is suppressed;

wherein the reference image is based on the difference image.

5. The method according to claim 1, further comprising capturing additional images with the optical source turned on, the additional images and the first image forming a plurality of images;

wherein obtaining the reference image comprises:

determining a lowest registered intensity level of each pixel of the imaging device among the plurality of images; and obtaining the reference image using said determined lowest registered intensity level for each respective pixel of the imaging device.

6. A method for operating a geodetic instrument comprising an optical source for assisting a user in aiming at a target in a scene by emitting optical pulses forming a spot at the target, and an imaging device, wherein the imaging device and the optical source share a common optical channel within the geodetic instrument, the method comprising:

capturing a plurality of images with the optical source turned on;

determining a lowest registered intensity level of each pixel of the imaging device among the plurality of images;

obtaining a reference image using said determined lowest registered intensity level for each respective pixel of the imaging device, the reference image representing crosstalk occurring in the common optical channel;

capturing a to-be processed image with the optical source turned on; and processing the captured to-be processed image with the reference image for removing crosstalk from the to-be processed image.

7. A geodetic instrument comprising:

an optical source for assisting a user in aiming at a target in a scene by emitting optical pulses forming a spot at the target;

an imaging device configured to capture images of the scene using a frame sequence; wherein the imaging device and the optical source share a common optical channel within the geodetic instrument; and a processing unit configured to operate the geodetic instrument in accordance with a method as defined in claim 1.

8. The geodetic instrument according to claim 7, wherein the optical source is an infrared laser, and wherein the imaging device is an infrared camera or a thermal imaging camera.

9. The geodetic instrument according to claim 7, wherein the optical source is a laser in the visible spectrum, and wherein the imaging device is configured to detect visible light.

\* \* \* \* \*